US011077495B2

(12) United States Patent
Tsubota et al.

(10) Patent No.: US 11,077,495 B2
(45) Date of Patent: *Aug. 3, 2021

(54) METAL POWDER, METHOD OF PRODUCING ADDITIVELY-MANUFACTURED ARTICLE, AND ADDITIVELY-MANUFACTURED ARTICLE

(71) Applicants: DAIHEN CORPORATION, Osaka (JP); TECHNOLOGY RESEARCH INSTITUTE OF OSAKA PREFECTURE, Izumi (JP)

(72) Inventors: Ryusuke Tsubota, Osaka (JP); Junichi Tanaka, Osaka (JP); Yohei Oka, Osaka (JP); Takayuki Nakamoto, Izumi (JP); Takahiro Sugahara, Izumi (JP); Mamoru Takemura, Izumi (JP); Sohei Uchida, Izumi (JP)

(73) Assignees: DAIHEN CORPORATION, Osaka (JP); Osaka Research Institute of Industrial Science and Technology, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,348

(22) Filed: Jul. 24, 2017

(65) Prior Publication Data

US 2017/0320134 A1    Nov. 9, 2017

Related U.S. Application Data

(62) Division of application No. 15/151,693, filed on May 11, 2016.

(30) Foreign Application Priority Data

May 13, 2015 (JP) .............................. JP2015-097974

(51) Int. Cl.
*B22F 1/00* (2006.01)
*C22C 1/04* (2006.01)
(Continued)

(52) U.S. Cl.
CPC .............. *B22F 1/0003* (2013.01); *B22F 3/24* (2013.01); *B22F 12/00* (2021.01); *C22C 1/0425* (2013.01);
(Continued)

(58) Field of Classification Search
CPC .......... C22C 9/06; B33Y 80/00; B33Y 10/00; B22F 1/0003
(Continued)

(56) References Cited

U.S. PATENT DOCUMENTS 3,428,442 A    2/1969 Yurasko
4,755,235 A    7/1988 Matidori et al.
(Continued)

FOREIGN PATENT DOCUMENTS

CN    86104601 A    1/1998
CN    101140977 A    3/2008
(Continued)

OTHER PUBLICATIONS

D.Q. Zhang et al., "Investigation on forming process of copper alloys via Selective Laser Melting", High Value Manufacturing, 2014, pp. 285-289 (total 5 pages).
(Continued)

*Primary Examiner* — Weiping Zhu
(74) *Attorney, Agent, or Firm* — Sughrue Mion, PLLC

(57) ABSTRACT

A metal powder contains not less than 0.10 mass % and not more than 1.00 mass % of at least one of chromium and silicon, and a balance of copper. The total content of the chromium and the silicon is not more than 1.00 mass %. In accordance with an additive manufacturing method for this
(Continued)

US 11,077,495 B2

Page 2 metal powder, an additively-manufactured article made from a copper alloy is provided. The additively-manufactured article has both an adequate mechanical strength and an adequate electrical conductivity.

10 Claims, 8 Drawing Sheets

(51) Int. Cl.
<table>
<tr><td>C22C 9/00</td><td>(2006.01)</td></tr>
<tr><td>C22C 9/10</td><td>(2006.01)</td></tr>
<tr><td>C22C 9/06</td><td>(2006.01)</td></tr>
<tr><td>B22F 12/00</td><td>(2021.01)</td></tr>
<tr><td>B22F 3/24</td><td>(2006.01)</td></tr>
<tr><td>B22F 10/10</td><td>(2021.01)</td></tr>
<tr><td>B33Y 10/00</td><td>(2015.01)</td></tr>
<tr><td>B33Y 70/00</td><td>(2020.01)</td></tr>
<tr><td>B33Y 80/00</td><td>(2015.01)</td></tr>
<tr><td>B22F 9/08</td><td>(2006.01)</td></tr>
</table>

(52) U.S. Cl.
CPC .......... *C22C 9/00* (2013.01); *C22C 9/06* (2013.01); *C22C 9/10* (2013.01); *B22F 1/0011* (2013.01); *B22F 9/08* (2013.01); *B22F 10/10* (2021.01); *B22F 2003/248* (2013.01); *B22F 2009/0812* (2013.01); *B22F 2009/0828* (2013.01); *B22F 2009/0836* (2013.01); *B22F 2998/10* (2013.01); *B33Y 10/00* (2014.12); *B33Y 70/00* (2014.12); *B33Y 80/00* (2014.12); *Y02P 10/25* (2015.11)

(58) Field of Classification Search
USPC .......................................................... 419/5
See application file for complete search history.

(56) References Cited

U.S. PATENT DOCUMENTS

<table>
<tr><td>5,292,477 A</td><td>3/1994</td><td>Chance et al.</td></tr>
<tr><td>5,352,404 A</td><td>10/1994</td><td>Yoshioka et al.</td></tr>
<tr><td>5,480,472 A</td><td>1/1996</td><td>Noda et al.</td></tr>
<tr><td>2002/0041818 A1</td><td>4/2002</td><td>Abe et al.</td></tr>
<tr><td>2004/0213692 A1</td><td>10/2004</td><td>Ishijima</td></tr>
<tr><td>2006/0086437 A1</td><td>4/2006</td><td>Nippert et al.</td></tr>
<tr><td>2006/0239853 A1</td><td>10/2006</td><td>Maehara et al.</td></tr>
<tr><td>2008/0061315 A1</td><td>3/2008</td><td>Hata</td></tr>
<tr><td>2009/0053090 A1</td><td>2/2009</td><td>Terao</td></tr>
<tr><td>2010/0034982 A1*</td><td>2/2010</td><td>Fuwa ............... B22F 3/1055 427/554</td></tr>
<tr><td>2010/0326573 A1*</td><td>12/2010</td><td>Mihara .............. C22C 9/06 148/686</td></tr>
<tr><td>2011/0056591 A1</td><td>3/2011</td><td>Kondoh et al.</td></tr>
<tr><td>2013/0143066 A1</td><td>6/2013</td><td>Hirano et al.</td></tr>
<tr><td>2014/0154088 A1</td><td>6/2014</td><td>Etter et al.</td></tr>
<tr><td>2015/0125334 A1*</td><td>5/2015</td><td>Uetani ............... B22F 5/10 419/6</td></tr>
<tr><td>2015/0273631 A1</td><td>10/2015</td><td>Kenney et al.</td></tr>
<tr><td>2016/0212836 A1*</td><td>7/2016</td><td>Arai ................. C25D 1/04</td></tr>
<tr><td>2016/0332227 A1*</td><td>11/2016</td><td>Tsubota ............ B22F 3/24</td></tr>
<tr><td>2017/0320134 A1</td><td>11/2017</td><td>Tsubota et al.</td></tr>
<tr><td>2017/0333987 A1</td><td>11/2017</td><td>Tsubota et al.</td></tr>
</table>

FOREIGN PATENT DOCUMENTS

<table>
<tr><td>CN</td><td>101815799 A</td><td>8/2010</td></tr>
<tr><td>CN</td><td>101896629 A</td><td>11/2010</td></tr>
<tr><td>CN</td><td>103097580 A</td><td>5/2013</td></tr>
<tr><td>CN</td><td>103146948 A</td><td>6/2013</td></tr>
<tr><td>CN</td><td>102912342 B</td><td>5/2014</td></tr>
<tr><td>CN</td><td>104404509 A</td><td>3/2015</td></tr>
<tr><td>CN</td><td>104475745 A</td><td>4/2015</td></tr>
<tr><td>CN</td><td>104755197 A</td><td>7/2015</td></tr>
<tr><td>CN</td><td>105132734 A</td><td>12/2015</td></tr>
<tr><td>EP</td><td>0469578 A2</td><td>2/1992</td></tr>
<tr><td>EP</td><td>1361288 A1</td><td>11/2003</td></tr>
<tr><td>JP</td><td>44-27126 B</td><td>11/1969</td></tr>
<tr><td>JP</td><td>47-1685 B1</td><td>1/1972</td></tr>
<tr><td>JP</td><td>S60-50161 A</td><td>3/1985</td></tr>
<tr><td>JP</td><td>S61-163223 A</td><td>7/1986</td></tr>
<tr><td>JP</td><td>H04-95318 A</td><td>3/1992</td></tr>
<tr><td>JP</td><td>H04-154018 A</td><td>5/1992</td></tr>
<tr><td>JP</td><td>H05-20491 B2</td><td>3/1993</td></tr>
<tr><td>JP</td><td>H05-217473 A</td><td>8/1993</td></tr>
<tr><td>JP</td><td>H09-324203 A</td><td>12/1997</td></tr>
<tr><td>JP</td><td>H10-88201 A</td><td>4/1998</td></tr>
<tr><td>JP</td><td>11-229057 A</td><td>8/1999</td></tr>
<tr><td>JP</td><td>2000-300129 A</td><td>10/2000</td></tr>
<tr><td>JP</td><td>2002-115004 A</td><td>4/2002</td></tr>
<tr><td>JP</td><td>2002-249804 A</td><td>9/2002</td></tr>
<tr><td>JP</td><td>2004-323953 A</td><td>11/2004</td></tr>
<tr><td>JP</td><td>2005-314806 A</td><td>11/2005</td></tr>
<tr><td>JP</td><td>2005330583 A</td><td>12/2005</td></tr>
<tr><td>JP</td><td>2010-13726 A</td><td>1/2010</td></tr>
<tr><td>JP</td><td>2011-21218 A</td><td>2/2011</td></tr>
<tr><td>JP</td><td>2014-129597 A</td><td>7/2014</td></tr>
<tr><td>JP</td><td>2016-53198 A</td><td>4/2016</td></tr>
<tr><td>JP</td><td>6030186 B1</td><td>11/2016</td></tr>
<tr><td>WO</td><td>02092264 A1</td><td>11/2002</td></tr>
<tr><td>WO</td><td>2009084645 A1</td><td>7/2009</td></tr>
<tr><td>WO</td><td>2015/030209 A1</td><td>3/2015</td></tr>
<tr><td>WO</td><td>WO-2015030209 A1 *</td><td>3/2015</td><td>............... C25D 1/04</td></tr>
</table>

OTHER PUBLICATIONS

Communication dated Jun. 29, 2017, from Japanese Patent Office in counterpart application No. 2017-700495 for Notice of Opposition Against Patent dated May 18, 2017.
Communication dated Jun. 29, 2017, from Japanese Patent Office in counterpart application No. 2017-700495 for Notice of Opposition Against Patent dated May 24, 2017.
Communication dated Mar. 1, 2016, issued from the State Intellectual Property Office of People's Republic of China in counterpart Application No. 201610319718.6.
Communication dated Oct. 4, 2016, issued by the European Patent Office in corresponding European Application No. 16169139.9.
International Search Report dated Aug. 2, 2016 from the International Bureau in counterpart International Application No. PCT/JP2016/063712.
Office Action from the Taiwan Intellectual Property Office dated Dec. 2, 2016 in Taiwanese Application No. 105114761.
Furukawa Electric: Alloy Type: Copper and Copper Alloy Products, Copyright 2011.
Final Office Action dated Sep. 28, 2018 issued by the United States Patent and Trademark Office in U.S. Appl. No. 15/151,693.
Notice of Preliminary Rejection dated Jul. 17, 2019 in counterpart Korean Patent Application No. 10-2017-7035151 with English translation.
Communication dated May 26, 2020 by the Japanese Patent Office in application No. 2016-185949.
Office Action dated May 23, 2018 in U.S. Appl. No. 15/657,300.
Office Action dated Apr. 18, 2018 in U.S. Appl. No. 15/151,693.
Office Action dated Aug. 2, 2017 in U.S. Appl. No. 15/151,693.
Office Action dated Nov. 15, 2017 in U.S. Appl. No. 15/151,693.
Office Action dated Aug. 1, 2019 in U.S. Appl. No. 15/151,693.
Office Action dated Dec. 19, 2019 in U.S. Appl. No. 15/151,693.
Office Action dated Feb. 11, 2019 in U.S. Appl. No. 15/151,693.
Office Action dated Mar. 26, 2020 in U.S. Appl. No. 15/151,693.
Office Action dated Oct. 9, 2018 in U.S. Appl. No. 15/657,300.
Communication dated Sep. 26, 2017 from the Japanese Patent Office in application No. 2017-111709.
Christian Lehnert et al., "Recent trend in production of high quality, spherical metal powder particles using inert gas atomization equipment", The Special Steel, vol. 65, No. 4, Jul. 1, 2016, p. 65 (2 pages total).

(56) References Cited

OTHER PUBLICATIONS

Communication dated Sep. 11, 2020, issued by the Korean Intellectual Property Office in application No. 10-2019-7014723.
Extended European Search Report dated Apr. 4, 2018 issued by the European Patent Office in application No. 17198275.4.
First Office Action dated May 8, 2019 in Chinese Patent Application No. 201711001476.7.
Gas Atomization Powder for Additive Manufacturing, Sanyo Technical Report, vol. 22 (2015) No. 1, pp. 62-64 (4 pages total).
Japanese Notice of Opposition dated Apr. 11, 2019, Opposition No. 2017-200187 (Patent No. 6389557) with English translation.
Miyakawa et al., "Producing Cu—Cr Alloy by Selective Laser Melting," Abstract of Spring Meeting of Japan Society of Powder and Powder Metallurgy, 2015, p. 75. (4 pages total).
Nomura et al., "Microstructure and mechanical properties of a Cu alloy fabricated by selective laser melting process," Current Advances in Materials and Processes, vol. 28, No. 2, 2015, p. 180. (5 pages total).
Office Action dated Nov. 10, 2020 in Taiwanese Application No. 107139042.
Office Action dated Nov. 11, 2020 in Taiwanese Application No. 107139043.
Popovich et al., "Microstructure and mechanical properties of additive manufactured copper alloy", Materials Letters, vol. 179, May 9, 2016, pp. 38-41, XP029562455 (4 pages total).
Tetsuji Kuse, "Introduction of 3D printer "EOS M280"", Sanyo Technical Report, vol. 23 (2016) No. 1, pp. 31-33 ( 4 pages total).
Office Action dated Aug. 2, 2019 in U.S. Appl. No. 15/791,675.
Office Action dated Feb. 20, 2020 in U.S. Appl. No. 15/791,675.
Office Action dated Jul. 13, 2020 in U.S. Appl. No. 15/791,675.
Dr. Konrad Wissenbach, Additive Manufacturing of Copper Components, Fraunfoher Institute for Laser Technology ILT, Jun. 2010.
Schmelzmetall, Material Data Sheet, Hovadur K 220, Mar. 1, 2007.
Dr. Wilhelm Meiners, Additive Manufacturing of Copper Components, Fraunhofer Institute for Laser Technology ILT, Nov. 2011.
Copper Casting Alloys, Copper Development Association, 1994 (114 pages total).
3T additive manufacturing Data Sheet—Copper CuCrZr (2 pages total).
NBM, archived material data sheet for chromium copper via the wayback machine Jan. 11, 2014.
Communication dated Mar. 12, 2019 from Japanese Patent Office in counterpart application No. 2016-185949.
Notice of Opposition dated Dec. 8, 2020 in European Patent No. 3315229 B1.
"Selektives Laserschmelzen von Kupfer and Kupferlegierungen", ("Selective Laser Melting of Copper and Copper Alloys", David Becker, Apprimus Verlag, Aachen; ISBN 978-3-86359-217-2), published Jul. 23, 1986 (76 pages total).
"Werkstoffdatenblatt Hovadur CCZ", ("Material data sheet for the material Hovadur CCZ", Schmelzmetall), Aug. 1, 2014 (2 pages total).
Wieland-K60 Datenblatt zu CuCr1Zr, ("Material data sheet for the material Wieland-K60", Wieland-Werke AG), 2014 (2 pages total).
Deutsches Kupferinstitut CuCr1Zr, ("Data sheet of the German Copper Institute regarding CuCr1Zr"), 2005 (9 pages total).
Communication dated Feb. 16, 2021 from the Indian Intellectual Property Office in Application No. 201917019927.

\* cited by examiner

METAL POWDER, METHOD OF PRODUCING ADDITIVELY-MANUFACTURED ARTICLE, AND ADDITIVELY-MANUFACTURED ARTICLE

CROSS-REFERENCE TO RELATED APPLICATIONS

This application is a divisional of U.S. application Ser. No. 15/151,693 filed on May 11, 2016, which claims priority from Japanese Patent Application No. 2015-097974 filed on May 13, 2015. The entire disclosures of the prior applications are considered part of the disclosure of the accompanying divisional, and are hereby incorporated by reference.

BACKGROUND OF THE INVENTION

Field of the Invention

The present invention relates to a metal powder, a method of producing an additively-manufactured article, and an additively-manufactured article.

Description of the Background Art

Japanese Patent Laying-Open No. 2011-21218 discloses a laser additive-manufacturing apparatus (so-called "3D printer") for metal powder.

SUMMARY OF THE INVENTION

The additive manufacturing method for metal powder is of interest as a processing technology for metal products. An advantage of this method is that complicated shapes which have been impossible by cutting work can be produced. Examples of additively-manufactured articles produced from iron-based alloy powder, aluminum alloy powder, titanium alloy powder, and the like have heretofore been reported. Currently, however, the kinds of metals available for additive manufacturing are limited, and there is a certain restriction on metal products to which additive manufacturing is applicable.

An object of the present invention is to provide a metal powder of a copper alloy for additive manufacturing, a method of producing an additively-manufactured article, and an additively-manufactured article, exhibiting both an adequate mechanical strength and an adequate electrical conductivity.

[1] The metal powder is a metal powder for additive manufacturing. The metal powder contains: not less than 0.10 mass % and not more than 1.00 mass % of at least one of chromium and silicon, a total content of the chromium and the silicon being not more than 1.00 mass %; and a balance of copper.

[2] The metal powder of the above [1] may contain: not less than 0.10 mass % and not more than 0.60 mass % of the chromium; and a balance of the copper.

[3] The metal powder of the above [1] may contain: not less than 0.10 mass % and not more than 0.60 mass % of the silicon; and a balance of the copper.

[4] The method of producing an additively-manufactured article includes: a first step of forming a powder layer including a metal powder of any of the above [1] to [3]; and a second step of forming a shaped layer by solidifying the metal powder at a predetermined position in the powder layer. The first step and the second step of this production method are successively repeated to stack the shaped layers and produce an additively-manufactured article.

[5] The method of producing an additively-manufactured article of the above [4] may further include a heat treatment step of heat-treating the additively-manufactured article.

[6] The additively-manufactured article is an additively-manufactured article produced from a metal powder of any of the above [1] to [3]. The additively-manufactured article is preferably heat-treated after being additively manufactured.

[7] The additively-manufactured article is an additively-manufactured article made from a copper alloy. The copper alloy contains: not less than 0.10 mass % and not more than 1.00 mass % of at least one of chromium and silicon, a total content of the chromium and the silicon being not more than 1.00 mass %; and a balance of copper. The additively-manufactured article has a relative density of not less than 96% and not more than 100% with respect to a theoretical density of the copper alloy, and has an electrical conductivity of not less than 26% IACS.

[8] As to the above [7], the copper alloy may be a chromium-containing copper alloy containing: not less than 0.10 mass % and not more than 0.60 mass % of the chromium; and a balance of the copper. In this case, the additively-manufactured article has a relative density of not less than 96% and not more than 100% with respect to a theoretical density of the chromium-containing copper alloy, and has an electrical conductivity of not less than 30% IACS.

[9] As to the above [7], the copper alloy may be a silicon-containing copper alloy containing: not less than 0.10 mass % and not more than 0.60 mass % of the silicon; and a balance of the copper. In this case, the additively-manufactured article has a relative density of not less than 96% and not more than 100% with respect to a theoretical density of the silicon-containing copper alloy, and an electrical conductivity of not less than 26% IACS.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention (hereinafter referred to as "the present embodiment") will be described. The present invention, however, is not limited thereto.

Initially, how the inventors of the present invention attained the present embodiment will be described.

For mechanical parts required to have an adequate mechanical strength and an adequate electrical conductivity, mostly copper is used. Examples of such mechanical parts may for example be parts of welding torch, electric power distribution facility, and the like. The inventors atomized an ingot of pure copper to thereby obtain a copper powder, and tried to produce an additively-manufactured article from this copper powder. A desired additively-manufactured article, however, could not be obtained by this method. Specifically, the produced article had many voids and the density of the article was significantly decreased relative to that of the original ingot. Further, the electrical conductivity of the article was also significantly decreased relative to that of the original ingot. The decrease of the density is considered as inevitably resulting in decrease of the mechanical strength. The inventors tried to improve physical properties by changing various conditions. As long as the pure copper was used, however, the final physical properties were not stable even under the same conditions, and it was impossible to obtain both an adequate mechanical strength and an adequate electrical conductivity.

The inventors then studied copper alloys. As a result, the inventors found that a copper alloy powder having a specific alloy composition could be used to produce an additively-manufactured article having both an adequate mechanical strength and an adequate electrical conductivity.

"Having both an adequate mechanical strength and an adequate electrical conductivity" herein means that an additively-manufactured article satisfies all of the following conditions (a) to (c).

Figure 8:
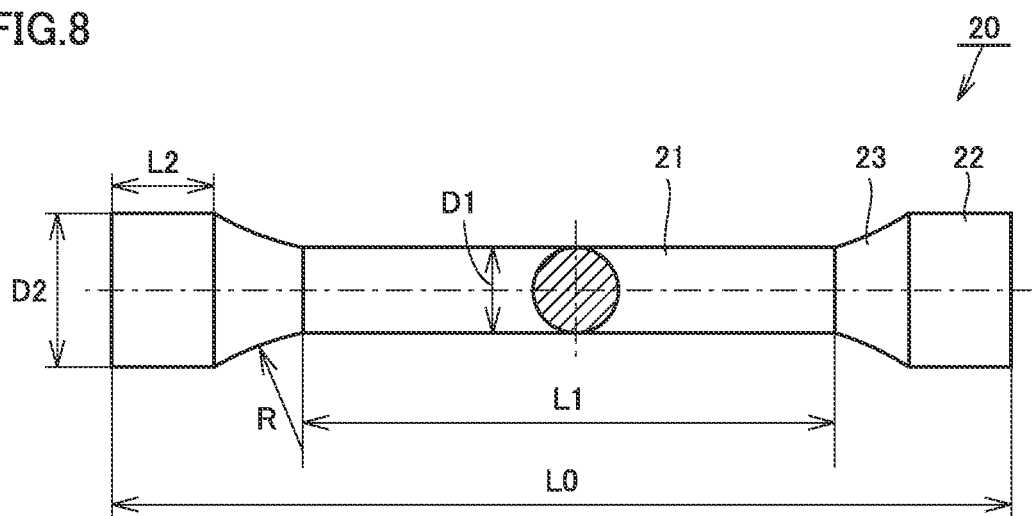
FIG. 8 is a plan view showing a test specimen used for a tensile test.

(1) The tensile strength is approximately equal to or more than 195 MPa. Namely, the tensile strength is approximately equivalent to or more than that of an ingot of oxygen-free copper (UNS No.: C10200). The tensile strength is measured through the following procedure. For measurement of the tensile strength, a tension testing machine of Grade one or more under "JIS B 7721: Tension/compression testing machines—verification and calibration of the force-measuring system" is used. A dumbbell-shaped test specimen 20 shown in FIG. 8 is manufactured. Dumbbell-shaped test specimen 20 is tensioned at a rate of 2 mm/min by using the tension testing machine until the test specimen is broken. At this time, as a gripping tool or jig, any tool appropriate for the shape of dumbbell-shaped test specimen 20 is used. Adjustments are further made so that a force is applied in the axial direction of dumbbell-shaped test specimen 20. The maximum tensile stress detected before the test specimen is broken is measured. The maximum tensile stress is divided by the cross-sectional area of a parallel portion 21 to thereby calculate the tensile stress. The cross-sectional area of parallel portion 21 is 9.616 m$^2$ (=π×3.5 mm×3.5 mm/4). The dimensions of respective parts of dumbbell-shaped test specimen 20 are as follows.

total length L0 of dumbbell-shaped test specimen 20: 36 mm
    length L1 of parallel portion 21: 18±0.5 mm
    diameter D1 of parallel portion 21: 3.5±0.05 mm
    radius R of shoulder portion 23: 10 mm
    length L2 of grip portion 22: 4.0 mm
    diameter D2 of grip portion 22: 6.0 mm (b) The relative density with respect to the theoretical density is 96% or more. The theoretical density of an alloy herein refers to the density of a cast material and having the same composition as the alloy. The relative density with respect to the theoretical density is a value in percentage determined by dividing the actually measured density of the additively-manufactured article by the theoretical density of the alloy.

(c) The electrical conductivity is 26% IACS or more, with respect to the electrical conductivity 100% IACS (International Annealed Copper Standard) of an annealed copper standard. Namely, the electrical conductivity is approximately equivalent to or more than that of an ingot of brass (UNS No: C26000).

[Metal Powder]

The metal powder of the present embodiment is a metal powder for additive manufacturing. The metal powder corresponds to toner/ink for a common two-dimensional printer. The metal powder contains: not less than 0.10 mass % and not more than 1.00 mass % of at least one of chromium (Cr) and silicon (Si), a total content of Cr and Si being not more than 1.00 mass %; and a balance of copper (Cu). The Cu content in the metal powder may for example be not less than 98 mass %, not less than 98.5 mass %, or not less than 99.0 mass %.

The Cu content in the metal powder can be measured by a method complying with "JIS H 1051: Copper and copper alloys—Determination of copper content." The Cr content can be measured by an ICP emission spectrometry complying with "JIS H 1071: Methods for determination of chromium in copper and copper alloys." The Si content can be measured by an ICP emission spectrometry complying with "JIS H 1061: Methods for determination of silicon in copper and copper alloys." The upper limit of at least one of Cr and Si in the metal powder may be 0.90 mass %, 0.80 mass %, 0.70 mass %, or 0.60 mass %. The lower limit of at least one of Cr and Si may be 0.15 mass %, or 0.20 mass %.

The metal powder may contain an impurity element besides Cu Cr, and Si. The impurity element may be an element (additive element) intentionally added during production. Namely, in the metal powder of the present embodiment, the balance may be Cu and an additive element. The impurity element may also be an element (incidental impurity) incidentally mixed during production. Namely, in the metal powder of the present embodiment, the balance may be Cu and an incidental impurity. Alternatively, the balance may be Cu, an additive element, and an incidental impurity. Examples of the impurity element may be oxygen (O), phosphorus (P), and the like. The content of the impurity element may for example be less than 0.10 mass %, or less than 0.05 mass %.

The metal powder of the present embodiment includes for example a chromium-containing copper alloy powder and a silicon-containing copper alloy powder as detailed below.

Chromium-Containing Copper Alloy Powder

The chromium-containing copper alloy powder contains not less than 0.10 mass % and not more than 0.60 mass % of Cr, and a balance of Cu. As described above, the balance may further include an additive element and/or an incidental impurity. An additively-manufactured article produced from this copper alloy powder having such a chemical composition can be expected to be improved particularly in electrical conductivity. In the chromium-containing copper alloy powder, the lower limit of the Cr content may for example be 0.15 mass %, 0.20 mass %, or 0.25 mass %. The upper limit of the Cr content may for example be 0.55 mass %, or 0.50 mass %. The Cr content may for example be not less than 0.22 mass % and not more than 0.51 mass %. In the case where the Cr content falls in these ranges, the additively-manufactured article may have well-balanced mechanical strength and electrical conductivity.

Silicon-Containing Copper Alloy Powder

The silicon-containing copper alloy powder contains not less than 0.10 mass % and not more than 0.60 mass % of Si, and a balance of Cu. As described above, the balance may include an additive element and/or an incidental impurity. An additively-manufactured article produced from this copper alloy powder having such a chemical composition can be expected to be improved particularly in mechanical strength. In the silicon-containing copper alloy powder, the lower limit of the Si content may for example be 0.15 mass %, 0.20 mass %, or 0.25 mass %. The upper limit of the Si content may for example be 0.55 mass %, or 0.50 mass %. The Si content may for example be not less than 0.21 mass % and not more than 0.55 mass %. In the case where the Si content falls in these ranges, the additively-manufactured article may have well-balanced mechanical strength and electrical conductivity.

Particle-Size Distribution

The particle-size distribution of the metal powder is appropriately adjusted based on conditions for producing the powder, sizing, sieving, or the like. The average particle size of the metal powder may be adjusted in accordance with the pitch at which layers are stacked to produce an additively-manufactured article. The average particle size of the metal powder may for example be approximately 100 to 200 μm, approximately 50 to 100 μm, or approximately 5 to 50 μm. The average particle size herein refers to a particle size at a cumulative value of 50% (so-called "d50") in a particle-size distribution measured by the laser diffraction/scattering method. The particle shape of the metal powder is not particularly limited. The particle shape may be a substantially spherical shape or an irregular shape.

Method of Producing Metal Powder

The metal powder of the present embodiment is produced for example by a gas atomization method or a water atomization method. Namely, while alloy components in the molten state are dropped from the bottom of a tundish, the alloy components are allowed to contact high-pressure gas or high-pressure water, and the alloy components are rapidly cooled to be solidified. In this way, the alloy components are formed into particles. Alternatively, plasma atomization method, centrifugal atomization method, or the like may for example be used to produce the metal powder. The metal powder obtained through these production methods tends to enable a dense additively-manufactured article to be obtained.

[Method of Producing Additively-Manufactured Article]

In the following, a method of producing an additively-manufactured article from the above-described metal powder will be described. Here, a description will be given of a powder bed fusion method using a laser as means for solidifying the metal powder. This means, however, is not limited to the laser as long as the means can solidify the metal powder. The means may for example be electron beam, plasma, or the like. In the present embodiment, an additive manufacturing (AM) method other than the powder bed fusion method may be used. For example, in the present embodiment, the directed energy deposition method may also be used. Further, in the present embodiment, cutting may be performed during additive manufacturing.

Figure 1:
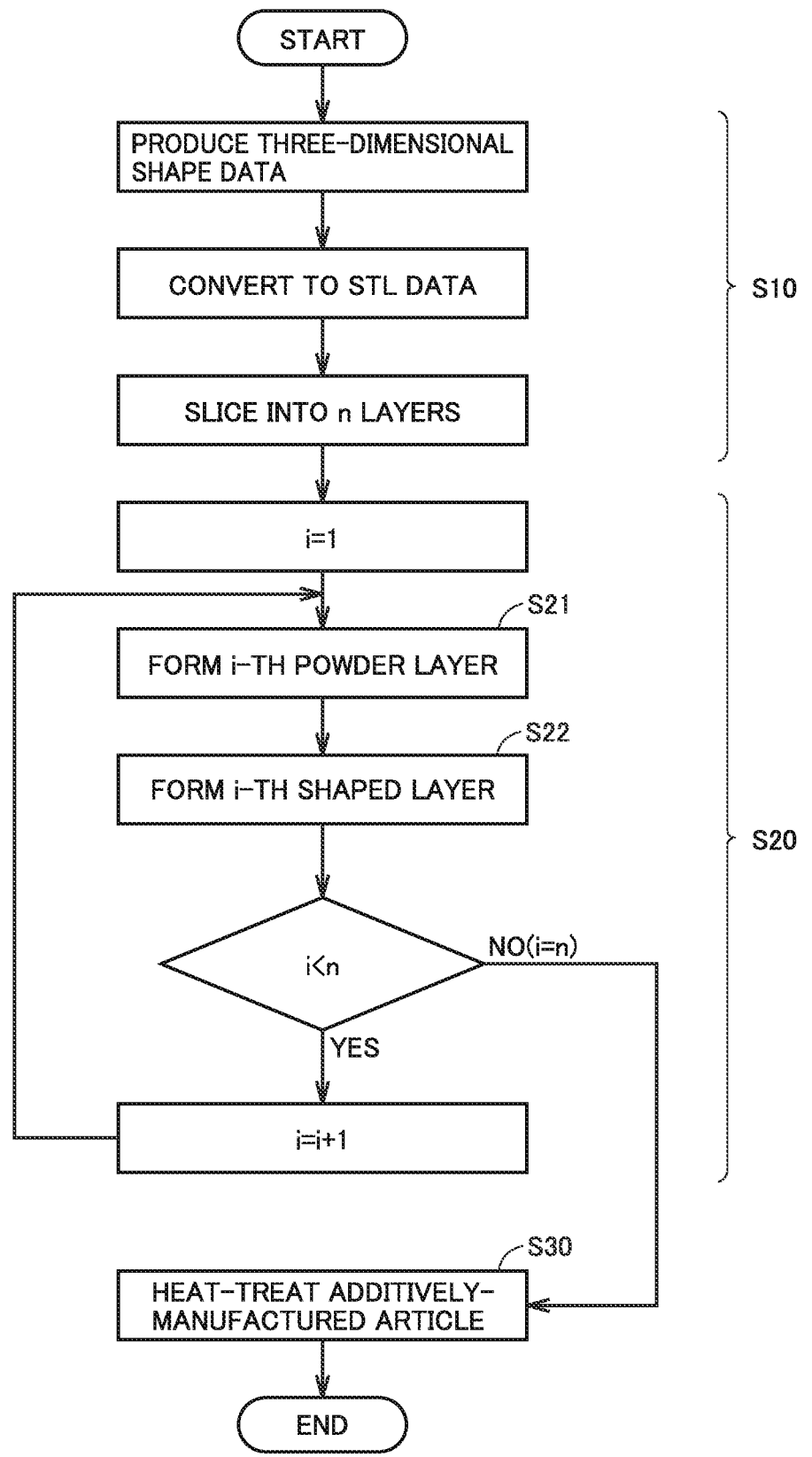
FIG. 1 is a flowchart generally showing a method of producing an additively-manufactured article according to an embodiment of the present invention.

FIG. 1 is a flowchart generally showing a method of producing an additively-manufactured article of the present embodiment. This production method includes a data processing step (S10) and an additive manufacturing step (S20). The production method may also include a heat treatment step (S30) after the additive manufacturing step (S20). The additive manufacturing step (S20) includes a first step (S21) and a second step (S22). According to this production method, the first step (S21) and the second step (S22) are successively repeated to thereby produce an additively-manufactured article. The method will be described hereinafter with reference to FIGS. 1 to 7.

1. Data Processing Step (S10)

Figure 2:
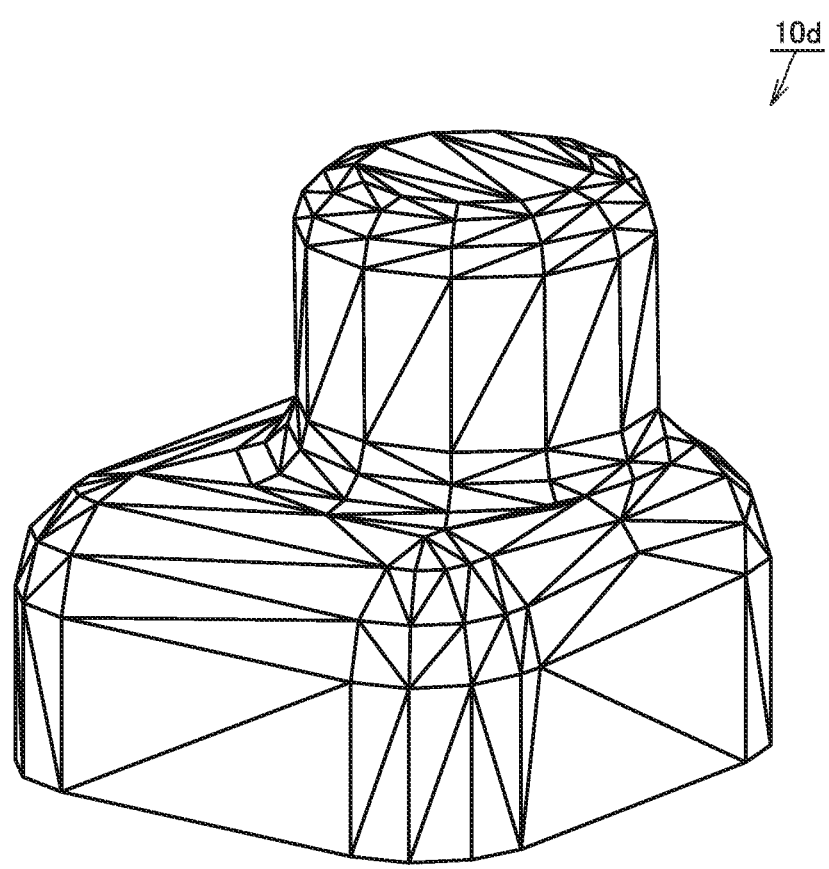
FIG. 2 is a schematic diagram showing an example of STL data.

First, three-dimensional shape data is produced by 3D-CAD or the like. The three-dimensional shape data is converted to STL data. FIG. 2 is a schematic diagram showing an example of STL data. In STL data 10d, division into elements (meshing) is done by the finite-element method, for example.

Figure 3:
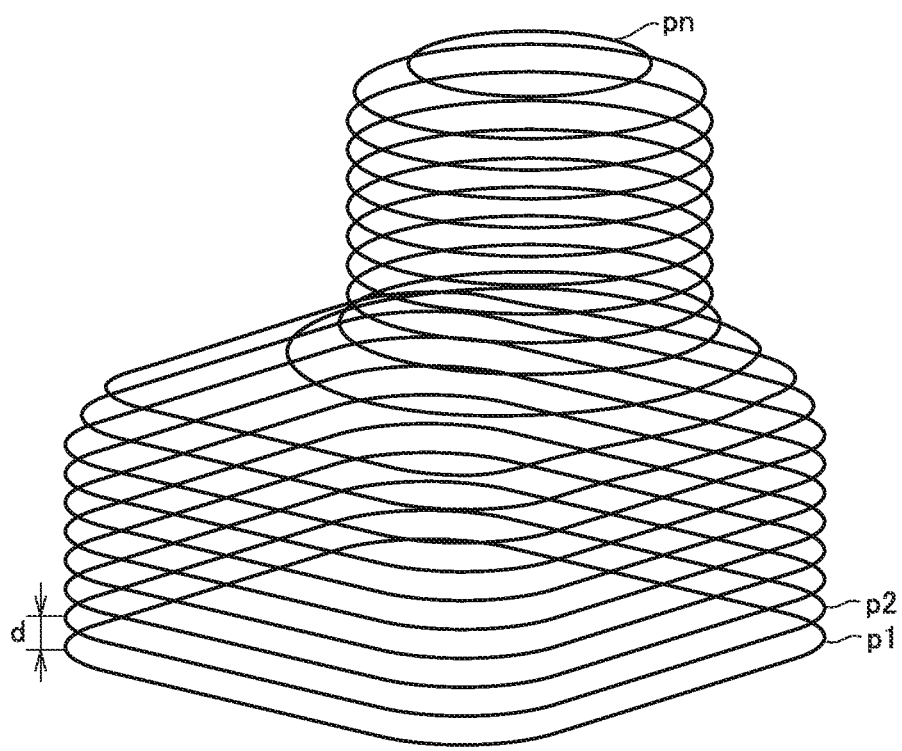
FIG. 3 is a schematic diagram showing an example of slice data.

From the STL data, slice data is produced. FIG. 3 is a schematic diagram showing an example of slice data. The STL data is divided into n layers, namely a first shaped layer p1 to an n-th shaped layer pn. The slice thickness d is approximately 10 to 150 μm for example.

2. Additive Manufacturing Step (S20)

Figure 4:
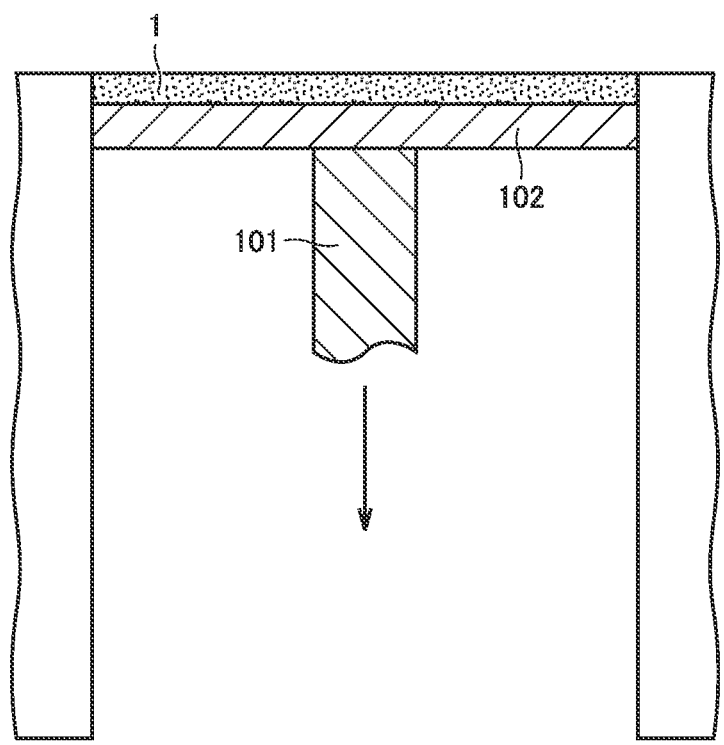
FIG. 4 is a first schematic diagram illustrating a process of producing an additively-manufactured article.

Subsequently, based on the slice data, an additively-manufactured article is produced. FIG. 4 is a first schematic diagram illustrating a process of producing an additively-manufactured article. A laser additive-manufacturing apparatus 100 shown in FIG. 4 includes a piston 101, a table 102 supported on piston 101, and a laser emission unit 103. This step and subsequent steps are carried out in an inert gas atmosphere for example for suppressing oxidation of the additively-manufactured article. The inert gas may for example be argon (Ar), nitrogen ($N_2$), helium (He), or the like. Instead of the inert gas, a reducing gas such as hydrogen ($H_2$) for example may be used. Moreover, a vacuum pump or the like may be used to produce a reduced-pressure atmosphere.

Piston 101 is configured to be capable of lifting and lowering table 102. On table 102, the additively-manufactured article is produced.

2-1. First Step (S21)

In the first step (S21), a powder layer including the metal powder is formed. Based on the slice data, piston 101 lowers table 102 by a distance corresponding to one layer. On table 102, the metal powder corresponding to one layer is spread. In this way, a first powder layer 1 including the metal powder is formed. The surface of first powder layer 1 is smoothed by means of a squeezing blade or the like (not shown). The powder layer may include multiple kinds of metal powders. For example, the powder layer may include both the chromium-containing copper alloy powder and the silicon-containing copper alloy powder as described above. The powder layer may also include a laser absorber (resin powder for example) or the like, in addition to the metal powder. The powder layer may be substantially made up of only the metal powder.

2-2. Second Step (S22)

Figure 5:
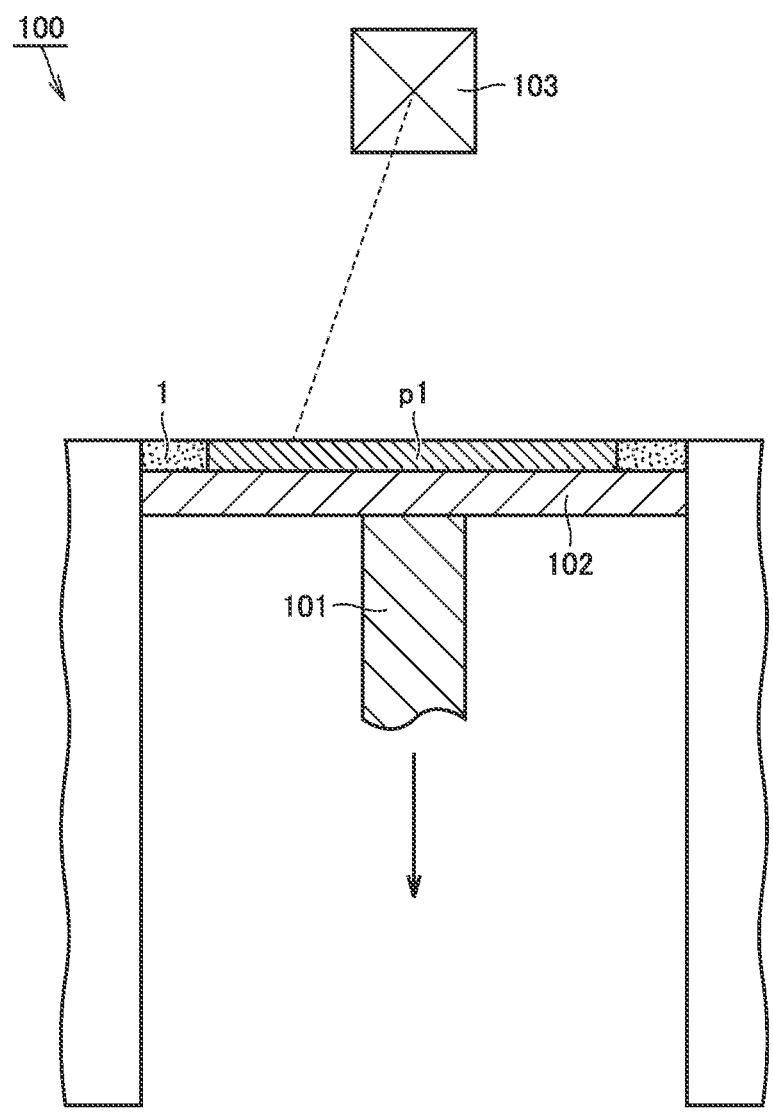
FIG. 5 is a second schematic diagram illustrating the process of producing an additively-manufactured article.

FIG. 5 is a second schematic diagram illustrating the process of producing an additively-manufactured article. In the second step (S22), a shaped layer which is to form a part of the additively-manufactured article is formed.

Laser emission unit 103 applies a laser beam to a predetermined position in first powder layer 1, based on the slice data. Before the laser beam is applied, the powder layer may be heated in advance. The metal powder irradiated with the laser beam is melted and sintered and accordingly solidified. In this way, the metal powder at a predetermined position in first powder layer 1 is solidified to thereby form first shaped layer p1.

As the laser emission unit of the present embodiment, a general-purpose laser device may be used. As a laser beam source, a fiber laser, a YAG laser, a $CO_2$ laser, a semiconductor laser, or the like is used. The laser beam output power may for example be approximately 100 to 1000 W, or approximately 200 to 500 W. The laser beam scanning velocity may be adjusted within a range for example of 100 to 1000 mm/s. The laser beam energy density may be adjusted within a range for example of 100 to 1000 J/mm³.

The laser beam energy density herein refers to a value calculated in accordance with the following expression (I):

$$E=P/(v \times s \times d) \quad (I).$$

In expression (I), E represents laser beam energy density [unit: J/mm³], P represents laser output power [unit: W], v represents scanning velocity [unit: mm/s], s represents scanning width [unit: mm], and d represents slice thickness [unit: mm].

Figure 6:
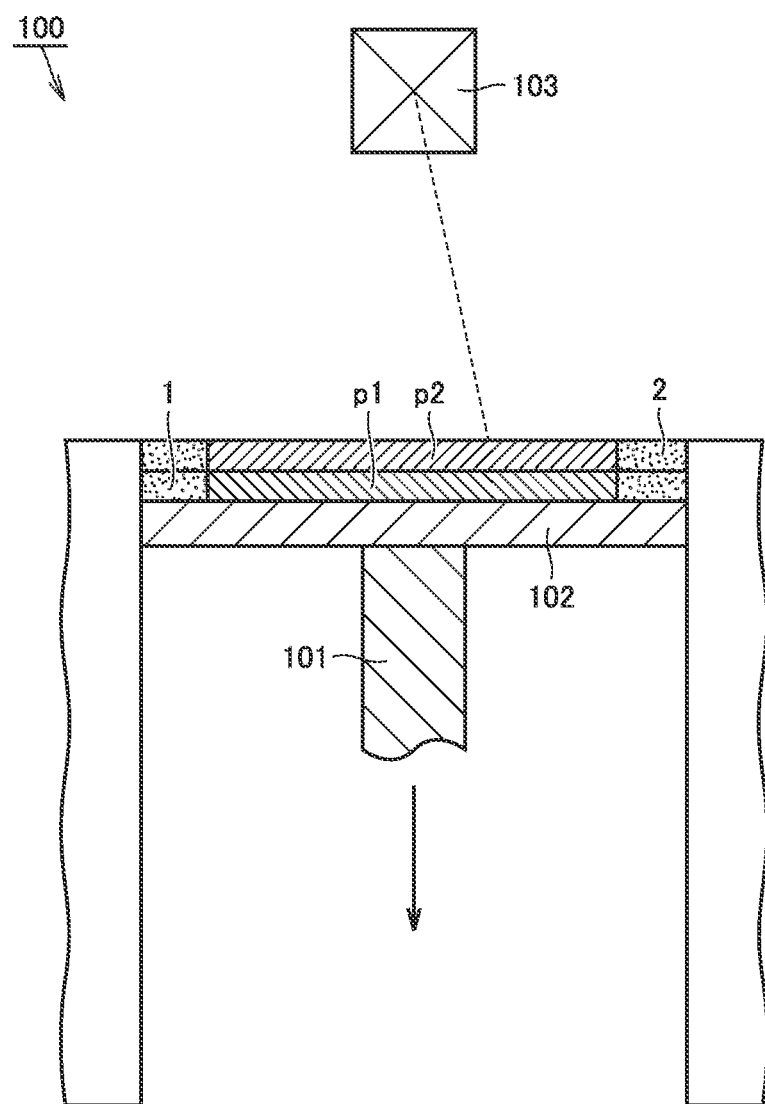
FIG. 6 is a third schematic diagram illustrating the process of producing an additively-manufactured article.
Figure 7:
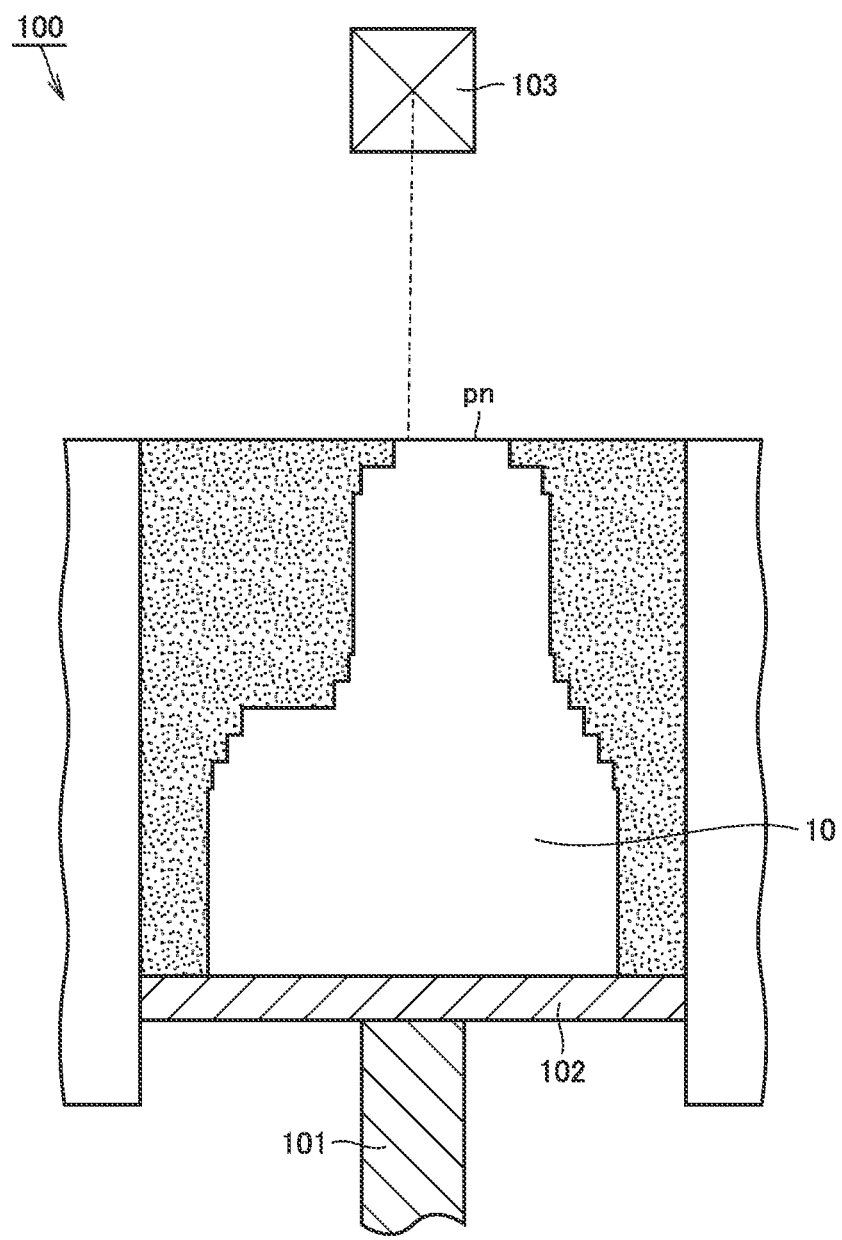
FIG. 7 is a fourth schematic diagram illustrating the process of producing an additively-manufactured article.

FIG. 6 is a third schematic diagram illustrating the process of producing an additively-manufactured article. As shown in FIG. 6, after first shaped layer p1 is formed, piston 101 further lowers table 102 by a distance corresponding to one layer. After this, a second powder layer 2 is formed in a similar manner to the above-described one, and a second shaped layer p2 is formed based on the slice data. After this, the first step (S21) and the second step (S22) are repeated. FIG. 7 is a fourth schematic diagram illustrating the process of producing an additively-manufactured article. As shown in FIG. 7, finally the n-th shaped layer pn is formed and thus an additively-manufactured article 10 is thus completed.

3. Third Step (S30)

Preferably, the additively-manufactured article is thereafter heat-treated. Namely, it is preferable for the additively-manufactured article to be heat-treated after additively manufactured. The heat treatment can be expected to improve the mechanical properties and the electrical conductivity of the additively-manufactured article. The atmosphere during the heat treatment may for example be an atmosphere of nitrogen, air, argon, hydrogen, vacuum, or the like. The heat treatment temperature may for example be not less than 300° C. and not more than 400° C. The time for heat treatment may for example be not less than two hours and not more than four hours.

[Additively-Manufactured Article]

In the following, a description will be given of an additively-manufactured article obtained in accordance with the above-described production method. The additively-manufactured article may have a shape which cannot be obtained by cutting. Moreover, the additively-manufactured article of the present embodiment has both an adequate mechanical strength and an adequate electrical conductivity. The additively-manufactured article of the present embodiment is applicable to a plasma torch by way of example.

In the case where the metal powder of the present embodiment is used as a raw material, the additively-manufactured article may have the following composition.

Namely, the additively-manufactured article of the present embodiment is an additively-manufactured article made from a specific copper alloy. The copper alloy contains: not less than 0.10 mass % and not more than 1.00 mass % of at least one of chromium and silicon, a total content of the chromium and the silicon being not more than 1.00 mass %; and a balance of copper. Like the metal powder, the balance of the copper alloy may include an additive element and/or an incidental impurity. The additively-manufactured article has a relative density of not less than 96% and not more than 100% with respect to the theoretical density of the copper alloy, and has an electrical conductivity of not less than 26% IACS.

In the copper alloy, the upper limit of the content of at least one of Cr and Si may be 0.90 mass %, 0.80 mass %, 0.70 mass %, or 0.60 mass %. The lower limit of the content of at least one of Cr and Si may be 0.15 mass % or 0.20 mass %.

The density of the additively-manufactured article can for example be measured in accordance with the Archimedes method. The density measurement in accordance with the Archimedes method may be done to comply with "JIS Z 2501: Sintered metal materials—Determination of density, oil content and open porosity." Water may be used as the liquid.

In the case where the relative density with respect to the theoretical density is not less than 96%, a mechanical density adequate for practical use can be expected. A higher relative density is desired. The relative density of the additively-manufactured article may be not less than 96.5%, not less than 97.0%, not less than 97.5%, not less than 98.0%, not less than 98.5%, or not less than 99.0%.

The electrical conductivity can be measured by means of a commercially-available eddy-current conductivity meter. A higher electrical conductivity is also desired. The electrical conductivity of the additively-manufactured article may be not less than 30% IACS, not less than 40% IACS, not less than 50% IACS, or not less than 60% IACS. The upper limit of the electrical conductivity may for example be 100% IACS.

Additively-Manufactured Article Made from Chromium-Containing Copper Alloy

In the case where the chromium-containing copper alloy powder of the present embodiment is used as a raw material, the additively-manufactured article may have the following composition.

Namely, the additively-manufactured article is an additively-manufactured article made from a specific chromium-containing copper alloy. The chromium-containing copper alloy contains not less than 0.10 mass % and not more than 0.60 mass % of Cr and a balance of Cu. Like the metal powder, the balance of the chromium-containing copper alloy may include an additive element and/or an incidental impurity. The additively-manufactured article has a relative density of not less than 96% and not more than 100% with respect to the theoretical density of the chromium-containing copper alloy, and has an electrical conductivity of not less than 30% IACS. In the case where the Cr content of the additively-manufactured article is not less than 0.10 mass % and not more than 0.30 mass %, the additively-manufactured article can be expected to have both a relative density of not less than 98% and an electrical conductivity of not less than 60% IACS.

Additively-Manufactured Article Made from Silicon-Containing Copper Alloy

In the case where the silicon-containing copper alloy powder of the present embodiment is used as a raw material, the additively-manufactured article may have the following composition.

Namely, the additively-manufactured article is an additively-manufactured article made from a specific silicon-containing copper alloy. The silicon-containing copper alloy contains not less than 0.10 mass % and not more than 0.60 mass % of Si and a balance of Cu. Like the metal powder, the balance of the silicon-containing copper alloy may include an additive element and/or an incidental impurity. The additively-manufactured article has a relative density of not less than 96% and not more than 100% with respect to the theoretical density of the silicon-containing copper alloy, and has an electrical conductivity of not less than 26% IACS. In the case where the Si content of the additively-manufactured article is not less than 0.10 mass % and not more than 0.30 mass %, the additively-manufactured article can be expected to have both a relative density of not less than 98.5% and an electrical conductivity of not less than 45% IACS.

EXAMPLES

In the following, the present embodiment will be described with Examples. The present embodiment, however, is not limited to them.

1. Preparation of Metal Powder

Metal powders A1, A2, A3, B1, B2, X, and Y each containing the chemical components shown in Table 1 were prepared.

TABLE 1

List of Metal Powders

| | chemical components | d50 (μm) |
|---|---|---|
| A1 | Cr (0.22 mass %); O (0.09 mass %); Cu (balance) | 25.0 |
| A2 | Cr (0.51 mass %); O (0.04 mass %); Cu (balance) | 25.0 |
| A3 | Cr (0.94 mass %); O (0.05 mass %); Cu (balance) | 20.7 |
| B1 | Si (0.21 mass %); O (0.01 mass %); P (0.01 mass %); Cu(balance) | 26.0 |
| B2 | Si (0.55 mass %); O (0.03 mass %); P (less than 0.01 mass %); Cu (balance) | 27.7 |
| X | Cu (99.99 mass % or more) | 21.3 |
| Y | Ni (2.52 mass %); Si (0.71 mass %); Cr (0.31 mass %); Cu (balance) | 20.0 |

These metal powders were produced in accordance with a predetermined atomization method. Metal powders A1, A2, A3, B1, and B2 correspond to examples of the present invention.

Metal powder X was produced from an ingot of a commercially-available pure-copper. Metal powder Y was produced from an ingot of a commercially-available copper alloy (product name "AMPCO940"). Metal powder X and metal powder Y correspond to comparative examples.

2. Laser Additive-Manufacturing Apparatus.

A laser additive-manufacturing apparatus with the following specifications was prepared.

Laser: fiber laser, maximum output power 400 W
Spot diameter: 0.05 to 0.20 mm
Scanning velocity: not more than 7000 mm/s
Layer stack pitch: 0.02 to 0.08 mm
Maximum build size: 250 mm×250 mm×280 mm 3. Production of Additively-Manufactured Article The above-described apparatus was used to produce an additively-manufactured article having a columnar shape (diameter 14 mm×height 15 mm).

3-1. Commercially-Available Pure Copper Powder

Following the flow shown in FIG. 1, the first step (S21) of forming a powder layer including the metal powder, and the second step (S22) of forming a shaped layer by applying a laser beam at a predetermined position in the powder layer to thereby solidify the metal powder were successively repeated to produce the additively-manufactured articles of No. X-1 to No. X-40. Conditions for producing each additively-manufactured article are shown in Table 2 and Table 3.

In accordance with the above-described methods, the relative density and the electrical conductivity of each additively-manufactured article were measured. The results are shown in Table 2 and Table 3.

TABLE 2

Commercially-Available Pure Copper

| | production method | | | additively-manufactured article | | | |
|---|---|---|---|---|---|---|---|
| | 1st step powder | 2nd step laser irradiation conditions | | | | | after heat treatment |
| No. | layer metal powder | scanning velocity mm/s | energy density J/mm³ | relative density % | tensile strength MPa | electrical conductivity % IACS | electrical conductivity % IACS |
| X-1 | X | 200 | 587.3 | unmeasurable | — | 49.58 | — |
| X-2 | X | 200 | 587.3 | unmeasurable | — | 64.72 | — |
| X-3 | X | 200 | 587.3 | unmeasurable | — | 50.44 | — |
| X-4 | X | 200 | 587.3 | unmeasurable | — | 65.85 | — |
| X-5 | X | 200 | 587.3 | 96.723 | — | 85.24 | — |
| X-6 | X | 200 | 587.3 | 92.260 | — | 67.21 | — |
| X-7 | X | 200 | 587.3 | unmeasurable | — | 48.89 | — |
| X-8 | X | 200 | 587.3 | unmeasurable | — | 64.95 | — |
| X-9 | X | 300 | 391.5 | unmeasurable | — | 63.13 | — |
| X-10 | X | 300 | 391.5 | unmeasurable | — | 63.59 | — |
| X-11 | X | 300 | 391.5 | unmeasurable | — | 67.89 | — |
| X-12 | X | 300 | 391.5 | unmeasurable | — | 65.63 | — |
| X-13 | X | 300 | 391.5 | unmeasurable | — | 58.15 | — |
| X-14 | X | 300 | 391.5 | unmeasurable | — | 68.12 | — |
| X-15 | X | 300 | 391.5 | unmeasurable | — | 64.04 | — |
| X-16 | X | 300 | 391.5 | unmeasurable | — | 61.32 | — |
| X-17 | X | 400 | 293.7 | unmeasurable | — | 70.51 | — |
| X-18 | X | 400 | 293.7 | unmeasurable | — | 63.13 | — |
| X-19 | X | 400 | 293.7 | unmeasurable | — | 75.21 | — |
| X-20 | X | 400 | 293.7 | unmeasurable | — | 66.15 | — |
| X-21 | X | 400 | 293.7 | unmeasurable | — | 62.68 | — |
| X-22 | X | 400 | 293.7 | 92.215 | — | 67.67 | — |
| X-23 | X | 400 | 293.7 | unmeasurable | — | 71.14 | — |
| X-24 | X | 400 | 293.7 | unmeasurable | — | 63.13 | — |

TABLE 3

Commercially-Available Pure Copper

| | 1st step powder | 2nd step laser irradiation conditions | | additively-manufactured article | | | after heat treatment |
|---|---|---|---|---|---|---|---|
| No. | layer metal powder | scanning velocity mm/s | energy density J/mm³ | relative density % | tensile strength MPa | electrical conductivity % IACS | electrical conductivity % IACS |
| X-25 | X | 500 | 234.9 | unmeasurable | — | 73.64 | — |
| X-26 | X | 500 | 234.9 | unmeasurable | — | 62.00 | — |
| X-27 | X | 500 | 234.9 | 93.054 | — | 82.10 | — |
| X-28 | X | 500 | 234.9 | unmeasurable | — | 64.27 | — |
| X-29 | X | 500 | 234.9 | unmeasurable | — | 64.04 | — |
| X-30 | X | 500 | 234.9 | unmeasurable | — | 65.40 | — |
| X-31 | X | 500 | 234.9 | unmeasurable | — | 75.21 | — |
| X-32 | X | 500 | 234.9 | unmeasurable | — | 62.23 | — |
| X-33 | X | 600 | 195.8 | unmeasurable | — | 89.46 | — |
| X-34 | X | 600 | 195.8 | unmeasurable | — | 73.96 | — |
| X-35 | X | 600 | 195.8 | 98.311 | — | 92.58 | — |
| X-36 | X | 600 | 195.8 | unmeasurable | — | 75.21 | — |
| X-37 | X | 600 | 195.8 | unmeasurable | — | 61.77 | — |
| X-38 | X | 600 | 195.8 | unmeasurable | — | 75.21 | — |
| X-39 | X | 600 | 195.8 | 98.311 | — | 90.24 | — |
| X-40 | X | 600 | 195.8 | unmeasurable | — | 73.33 | — |

As seen from Table 2 and Table 3, additively-manufactured articles produced from pure-copper powder (metal powder X) significantly vary from one another in final physical properties even under the same conditions. "Unmeasurable" in Table 2 means that a highly reliable density could not be measured by the Archimedes method due to an excessively large number of voids. The electrical conductivity of a pure-copper ingot may be considered as approximately 100% IACS. The additively-manufactured articles produced from the pure copper are significantly lower in electrical conductivity than the ingot of the pure copper. Based on these results, it is considered difficult to produce a practically applicable mechanical part from the pure copper powder.

3-2. Commercially-Available Copper Alloy Powder

Under the conditions shown in Table 4, additively-manufactured articles of No. Y-1 to No. Y-7 were produced in a similar manner to the above-described one. Conditions for producing each additively-manufactured article are shown in Table 4.

In accordance with the above-described methods, the relative density and the electrical conductivity of each additively-manufactured article were measured. The results are shown in Table 4.

TABLE 4

Commercially-Available Copper Alloy

| | 1st step powder | 2nd step laser irradiation conditions | | additively-manufactured article | | | after heat treatment |
|---|---|---|---|---|---|---|---|
| No. | layer metal powder | scanning velocity mm/s | energy density J/mm³ | relative density % | tensile stress MPa | electrical conductivity % IACS | electrical conductivity % IACS |
| Y-1 | Y | 400 | 156.3 | 99.03% | — | — | — |
| Y-2 | Y | 400 | 156.3 | 98.98% | — | 15.97 | 18.23 |
| Y-3 | Y | 400 | 156.3 | 99.07% | — | 15.97 | 18.23 |
| Y-4 | Y | 400 | 156.3 | 99.30% | — | — | — |
| Y-5 | Y | 800 | 192.7 | 99.23% | — | 15.93 | 18.37 |
| Y-6 | Y | 800 | 192.7 | 99.49% | — | 15.97 | 18.50 |
| Y-7 | Y | 800 | 192.7 | 99.33% | — | — | — |

The additively-manufactured articles produced from the commercially-available copper alloy powder (metal powder Y) had a higher density than that of the pure copper. The additively-manufactured articles, however, had an electrical conductivity significantly lower than that of the original material (approximately 45.5% IACS).

3-3. Chromium-Containing Copper Alloy Powder 3-3-1. Cr=0.22 mass %

Under the conditions shown in Table 5, additively-manufactured articles of No. A1-1 to No. A1-11 were produced in a similar manner to the above-described one. Further, after the additively-manufactured article was produced, the article was heat-treated (S30). Conditions for the heat treatment included a nitrogen atmosphere and 300° C.×3 hours (the same conditions are applied to the following heat treatment). The physical properties of each additively-manufactured article were evaluated. The results of evaluation are shown in Table 5. The tensile strength was measured by means of a test specimen, namely a dumbbell-shaped test specimen 20 shown in Table 8 which was produced separately, under the conditions shown for No. A1-12 to No. A1-14 (the same is applied as well to the following tensile strength).

TABLE 5

Cr-Containing Cu alloy (Cr = 0.22 mass %)

| | production method | | | additively-manufactured article | | | after heat treatment |
|---|---|---|---|---|---|---|---|
| | 1st step powder | 2nd step laser irradiation conditions | | | | | |
| No. | layer metal powder | scanning velocity mm/s | energy density J/mm$^3$ | relative density % | tensile strength MPa | electrical conductivity % IACS | electrical conductivity % IACS |
| A1-1 | A1 | 200 | 587.3 | 96.395 | — | 55.88 | 62.57 |
| A1-2 | A1 | 300 | 391.5 | 97.167 | — | 57.62 | 63.93 |
| A1-3 | A1 | 400 | 293.7 | 97.173 | — | 56.63 | 62.68 |
| A1-4 | A1 | 500 | 234.9 | 97.352 | — | 56.31 | 62.00 |
| A1-5 | A1 | 600 | 195.8 | 97.967 | — | 56.42 | 62.00 |
| A1-6 | A1 | 700 | 167.8 | 97.027 | — | 56.31 | 61.78 |
| A1-7 | A1 | 600 | 274.1 | 98.241 | — | 59.40 | 63.47 |
| A1-8 | A1 | 600 | 228.4 | 98.353 | 215.02 | 60.42 | 64.27 |
| A1-9 | A1 | 600 | 195.8 | 97.967 | — | 56.42 | 62.00 |
| A1-10 | A1 | 600 | 171.3 | 96.457 | — | 55.13 | 59.34 |
| A1-11 | A1 | 600 | 152.3 | 96.708 | — | 56.95 | 61.09 |
| A1-12 | A1 | 500 | 234.9 | — | 198.56 | — | — |
| A1-13 | A1 | 600 | 195.8 | — | 219.78 | — | — |
| A1-14 | A1 | 700 | 167.8 | — | 186.74 | — | — |

As seen from Table 5, variation of the final physical properties among the additively-manufactured articles produced from the copper alloy powder containing 0.22 mass % of chromium (metal powder A1) could be suppressed, as compared with the additively-manufactured articles produced from the pure copper as described above. These additively-manufactured articles produced from the copper alloy powder (metal powder A1) had both a practically adequate mechanical strength and a practically adequate electrical conductivity. With this composition, a high electrical conductivity of 60% IACS or more could be obtained after heat treatment.

3-3-2. Cr=0.51 mass %

Under the conditions shown in Table 6, additively-manufactured articles of No. A2-1 to No. A2-12 were produced. The physical properties of each additively-manufactured article were evaluated. The results of evaluation are shown in Table 6.

TABLE 6

Cr-Containing Cu alloy (Cr = 0.51 mass %)

| | production method | | | additively-manufactured article | | | |
|---|---|---|---|---|---|---|---|
| | 1st step | 2nd step | | | | | after heat treatment |
| | powder | laser irradiation conditions | | | | | |
| No. | layer metal powder | scanning velocity mm/s | energy density J/mm³ | relative density % | tensile strength MPa | electrical conductivity % IACS | electrical conductivity % IACS |
| A2-1 | A2 | 200 | 587.3 | 98.952 | — | 33.26 | 36.86 |
| A2-2 | A2 | 300 | 391.5 | 99.243 | — | 32.95 | 36.99 |
| A2-3 | A2 | 400 | 293.7 | 99.199 | — | 33.01 | 37.17 |
| A2-4 | A2 | 500 | 234.9 | 99.484 | — | 33.38 | 37.41 |
| A2-5 | A2 | 600 | 195.8 | 99.484 | — | 33.75 | 37.66 |
| A2-6 | A2 | 500 | 274.1 | 99.361 | — | 33.28 | 37.50 |
| A2-7 | A2 | 600 | 228.4 | 99.596 | — | 33.01 | 37.56 |
| A2-8 | A2 | 500 | 234.9 | 99.277 | — | 33.44 | 37.99 |
| A2-9 | A2 | 600 | 195.8 | 99.255 | — | 33.10 | 38.12 |
| A2-10 | A2 | 500 | 234.9 | — | 250.7 | — | — |
| A2-11 | A2 | 600 | 195.8 | — | 250.2 | — | — |
| A2-12 | A2 | 600 | 195.8 | — | 243.8 | — | — |

As seen from Table 6, variation of the final physical properties among the additively-manufactured articles produced from the copper alloy powder containing 0.51 mass % of chromium (metal powder A2) could be suppressed, as compared with the additively-manufactured articles produced from the pure copper as described above. These additively-manufactured articles produced from the copper alloy powder (metal powder A2) had both the denseness given by a relative conductivity of more than 99% and an electrical conductivity of more than 35% IACS. The additively-manufactured articles also had an adequate tensile strength.

3-3-3. Cr=0.94 mass %

Under the conditions shown in Table 7, additively-manufactured articles of No. A3-1 to No. A3-7 were produced. The physical properties of each additively-manufactured article were evaluated. The results of evaluation are shown in Table 7.

TABLE 7

Cr-Containing Cu Alloy (Cr = 0.94 mass %)

| | production method | | | additively-manufactured article | | | |
|---|---|---|---|---|---|---|---|
| | 1st step | 2nd step | | | | | after heat treatment |
| | powder | laser irradiation conditions | | | | | |
| No. | layer metal powder | scanning velocity mm/s | energy density J/mm³ | relative density % | tensile strength MPa | electrical conductivity % IACS | electrical conductivity % IACS |
| A3-1 | A3 | 200 | 587.3 | 99.250 | — | 23.92 | 26.35 |
| A3-2 | A3 | 300 | 391.5 | 99.064 | — | 23.64 | 26.25 |
| A3-3 | A3 | 400 | 293.7 | 99.176 | — | 23.64 | 26.41 |
| A3-4 | A3 | 500 | 234.9 | 99.101 | — | 23.59 | 26.44 |
| A3-5 | A3 | 600 | 195.8 | 99.228 | — | 23.92 | 26.63 |
| A3-6 | A3 | 200 | 587.3 | — | 281.41 | — | — |
| A3-7 | A3 | 600 | 195.8 | — | 266.60 | — | — |

As seen from Table 7, variation of the final physical properties among the additively-manufactured articles produced from the copper alloy powder containing 0.94 mass % of chromium (metal powder A3) could be suppressed, as compared with the additively-manufactured articles produced from the pure copper as described above. These additively-manufactured articles produced from the copper alloy powder (metal powder A3) had both a practically adequate mechanical strength and a practically adequate electrical conductivity. With this composition, denseness given by a relative density of more than 99% could be obtained. The additively-manufactured articles also had an adequate tensile strength.

3-4. Silicon-Containing Copper Alloy Powder 3-4-1. Si=0.21 mass %

Under the conditions shown in Table 8, additively-manufactured articles of No. B1-1 to No. B1-11 were produced. The physical properties of each additively-manufactured article were evaluated. The results of evaluation are shown in Table 8.

TABLE 8

| | Si-Containing Cu Alloy (Si = 0.21 mass %) | | | | | | |
|---|---|---|---|---|---|---|---|
| | production method | | | additively-manufactured article | | | |
| | 1st step | 2nd step laser irradiation conditions | | | | | after heat treatment |
| No. | layer metal powder | scanning velocity mm/s | energy density J/mm³ | relative density % | tensile strength MPa | electrical conductivity % IACS | electrical conductivity % IACS |
| B1-1 | B1 | 200 | 587.3 | 97.484 | — | 46.92 | 47.00 |
| B1-2 | B1 | 300 | 391.5 | 98.587 | — | 47.40 | 47.32 |
| B1-3 | B1 | 400 | 293.7 | 97.523 | — | 47.08 | 47.08 |
| B1-4 | B1 | 500 | 234.9 | 97.484 | — | 47.08 | 46.60 |
| B1-5 | B1 | 600 | 195.8 | 97.019 | — | 46.81 | 46.52 |
| B1-6 | B1 | 700 | 167.8 | 96.789 | — | 46.36 | 45.81 |
| B1-7 | B1 | 200 | 685.2 | 98.694 | — | 48.37 | 48.30 |
| B1-8 | B1 | 300 | 548.1 | 98.750 | — | 47.89 | 48.55 |
| B1-9 | B1 | 300 | 391.5 | 98.587 | — | 47.40 | 47.32 |
| B1-10 | B1 | 300 | 391.5 | — | 218.35 | — | — |
| B1-11 | B1 | 400 | 293.7 | — | 228.27 | — | — |

As seen from Table 8, variation of the final physical properties among the additively-manufactured articles produced from the copper alloy powder containing 0.21 mass % of silicon (metal powder B1) could be suppressed, as compared with the additively-manufactured articles produced from the pure copper as described above. These additively-manufactured articles produced from the copper alloy powder (metal powder B1) had both a practically adequate mechanical strength and a practically adequate electrical conductivity. With this composition, a high electrical conductivity of 45% IACS or more could be obtained.

3-4-2. Si=0.55 mass %

Under the conditions shown in Table 9, additively-manufactured articles of No. B2-1 to No. B2-8 were produced. The physical properties of each additively-manufactured article were evaluated. The results of evaluation are shown in Table 9.

TABLE 9

| | Si-Containing Cu Alloy (Si = 0.55 mass %) | | | | | | |
|---|---|---|---|---|---|---|---|
| | production method | | | additively-manufactured article | | | |
| | 1st step | 2nd step | | | | | after heat treatment |
| | powder | laser irradiation conditions | | | | | |
| No. | layer metal powder | scanning velocity mm/s | energy density J/mm³ | relative density % | tensile strength MPa | electrical conductivity % IACS | electrical conductivity % IACS |
| B2-1 | B2 | 100 | 1174.6 | 97.020 | — | 25.65 | — |
| B2-2 | B2 | 200 | 587.3 | 97.660 | — | 27.32 | — |
| B2-3 | B2 | 300 | 391.5 | 97.735 | — | 27.23 | 26.91 |
| B2-4 | B2 | 400 | 293.7 | 97.773 | — | 27.92 | 27.61 |
| B2-5 | B2 | 400 | 293.7 | 99.144 | 236.98 | 28.56 | 27.91 |
| B2-6 | B2 | 500 | 234.9 | 99.098 | 235.03 | 28.62 | 28.01 |
| B2-7 | B2 | 600 | 195.8 | 99.158 | — | 28.52 | 27.82 |
| B2-8 | B2 | 700 | 167.8 | 98.717 | — | 28.15 | 27.70 |

As seen from Table 9, variation of the final physical properties among the additively-manufactured articles produced from the copper alloy powder containing 0.55 mass % of silicon (metal powder B2) could be suppressed, as compared with the additively-manufactured articles produced from the pure copper as described above. These additively-manufactured articles produced from the copper alloy powder (metal powder B2) had both a practically adequate mechanical strength and a practically adequate electrical conductivity. With this composition, denseness given by a relative density of more than 99% could be obtained.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of using a copper alloy powder in additive manufacturing, the method comprising:
preparing the copper alloy powder;
using the copper alloy powder solely in the form of a powder layer substantially made up of only the copper alloy powder as a raw material for an additively-manufactured article; and
melting and/or sintering the copper alloy powder by irradiating the copper alloy powder with at least one selected from the group consisting of a laser, an electron beam and plasma so that metal particles included in the copper alloy powder fuse directly to each other, wherein
the copper alloy powder consists of
not less than 0.10 mass % and not more than 1.00 mass % of at least one of chromium and silicon, a total content of the chromium and the silicon being not more than 1.00 mass %; and
a balance of copper,
an element besides the copper, the chromium, and the silicon being less than 0.10 mass %.

2. The method of using a copper alloy powder in additive manufacturing according to claim 1, wherein the copper alloy powder comprises:
not less than 0.10 mass % and not more than 0.60 mass % of the chromium; and
a balance of the copper.

3. The method of using a copper alloy powder in additive manufacturing according to claim 1, wherein the copper alloy powder comprises:
not less than 0.10 mass % and not more than 0.60 mass % of the silicon; and
a balance of the copper.

4. The method of using a copper alloy powder in additive manufacturing according to claim 1, wherein the copper alloy powder is prepared by an atomization method.

5. A method of using a copper alloy powder in additive manufacturing, the method comprising:
preparing the copper alloy powder;
using the copper alloy powder solely in the form of a powder layer substantially made up of only the copper alloy powder as a raw material for an additively-manufactured article; and
melting and/or sintering the copper alloy powder by irradiating the copper alloy powder with at least one selected from the group consisting of a laser, an electron beam and plasma so that metal particles included in the copper alloy powder fuse directly to each other, wherein
the copper alloy powder consists of
not less than 0.22 mass % and not more than 0.94 mass % of chromium,
not less than 98.0 mass % of copper; and
an impurity element,
the impurity element being an element besides the copper and the chromium,
the impurity element being less than 0.10 mass %.

6. The method of using a copper alloy powder in additive manufacturing according to claim 5, wherein the copper alloy powder comprises more than 0.51 mass % and not more than 0.94 mass % of the chromium.

7. The method of using a copper alloy powder in additive manufacturing according to claim 5, wherein the copper alloy powder comprises not less than 0.22 mass % and not more than 0.51 mass % of the chromium.

8. The method of using a copper alloy powder in additive manufacturing according to claim 5, wherein the copper alloy powder comprises not less than 98.5 mass % of the copper.

9. The method of using a copper alloy powder in additive manufacturing according to claim 5, wherein the copper alloy powder comprises not less than 99.0 mass % of the copper.

10. The method of using a copper alloy powder in additive manufacturing according to claim 5, wherein the copper alloy powder is prepared by an atomization method.

\* \* \* \* \*